Dec. 3, 1929.  J. W. BRICH, JR  1,738,349
SEEDER
Filed Nov. 28, 1927
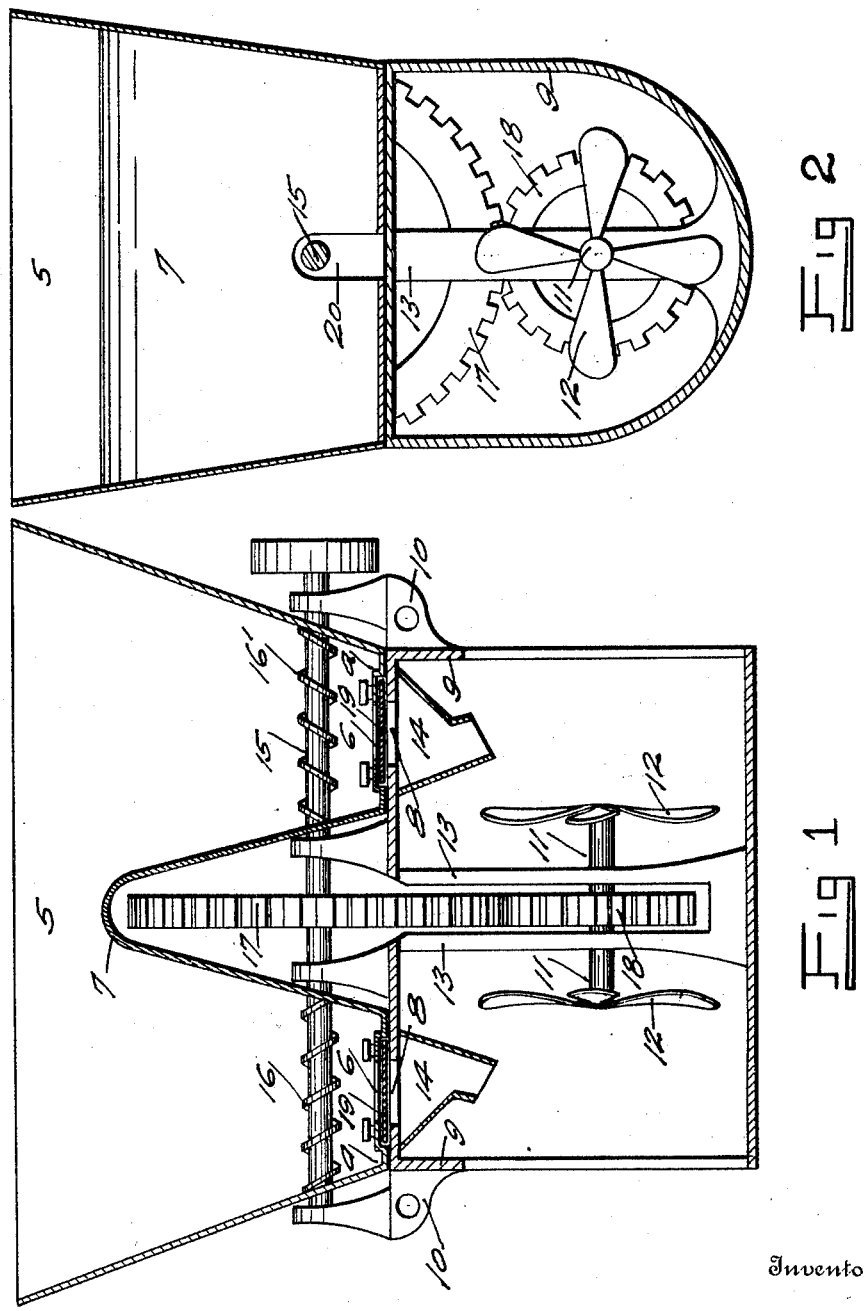
Inventor
J. W. BRICH, JR.
By Hiram A. Sturges
Attorney Patented Dec. 3, 1929

1,738,349

UNITED STATES PATENT OFFICE

JOHN W. BRICH, JR., OF NEOLA, IOWA

SEEDER

Application filed November 28, 1927. Serial No. 236,269.

This invention relates to seeders and more particularly to grass seeders requiring revolving fans for moving and distributing the seed.

In the operation of sowing grass seed the seed and mechanism for sowing are generally carried by a vehicle, the air-movements caused by the fans being depended upon for blowing and distributing the seed outwardly from the respective sides of the vehicle while driven forwardly, and the present invention is for use upon similar vehicles, and the seed is moved and distributed by action of similar fans.

One of the objects of the invention is to provide such a construction that the seed will be distributed more uniformly than ordinary.

Another object is to provide a hopper of such arrangement that the quantity of seed discharged at the respective sides of the vehicle will be equal.

Another object is to provide a forced feed of seed to the fans.

Since the seeder may be used for sowing various kinds of grass seed which may differ in weight and may be used for sowing various kinds of seed other than grass seed, provision is made in the hopper for adjustments, so that the quantity of seed delivered to the fans for distribution may be greater or less, as may be desired.

The invention includes mechanism for rotating the fans, which also may be conveniently assembled and will not be obtrusive in use, and includes a removable partition in the hopper as a convenient feature.

Still another object is to provide a seeder of few and simple parts so that it may be manufactured economically and will be durable in use.

With the foregoing objects in view and others to be mentioned hereinafter the invention presents a new and useful construction, combination and arrangement of parts as described herein and claimed, and as illustrated in the accompanying drawings, wherein,—

Fig. 1 is a view in longitudinal section through the hopper and casing to show mechanism therein. Fig. 2 is a vertical section through the same at one side of the partition.

Referring now to the drawing for a more particular description, numeral 5 indicates a hopper having a bottom $a$ provided with an aperture 6. Numeral 7 indicates a hollow, upwardly convergent partition adapted to be disposed within and to cover a part of the aperture 6 and thereby providing a pair of discharge-ports 8 at the sides of said partition.

The hopper is provided, below its bottom, with a casing 9 which is open at its ends, and the parts mentioned may be secured to a vehicle by any suitable means, ears 10 being shown for this purpose.

Numeral 11 indicates a shaft provided at its ends with a pair of fans 12, said shaft having any suitable mounting in the casing, standards 13 being shown for this purpose.

Numerals 14 indicate a pair of conducting tubes, each being in communication at its upper end with a discharge-port 8, and its lower end terminating adjacent to and outwardly of a fan 12.

As thus described, the seed in the hopper, after moving through the discharge-ports 8, will pass through the tubes 14 and, by action of the fans will be blown outwardly through the open ends of the casing to be scattered upon the ground while the vehicle is moving.

Numeral 15 indicates a shaft which is disposed within the hopper near the bottom thereof, said shaft having suitable bearings in the sides of the hopper and being rotatable by any suitable means. This shaft is preferably provided with inclined blades 16 and 16', and midway between its ends is provided with a gear-wheel 17 which is disposed in the hollow, upwardly convergent partition 7, and is in engagement with a gear-wheel 18 which is mounted on the shaft 11.

On account of the construction as described, the seed in the bottom of the hopper will be moved toward the discharge-ports 8, the inclination of the blades 16 and 16' being disposed at opposed angles relative to each other. It will be appreciated that grass seed or some kinds of grass seed may become pressed or matted in bunches at the bottom of the hopper, and since the rotating blades will prevent this objectionable feature, these parts operate to great advantage.

It will be seen that the partition 7 may be removed from the hopper, this feature being of advantage when assembling the parts.

Since some kinds of seed are of greater weight than others it is desirable to limit the quantity which moves through the discharge-ports 8 during operation and therefore slides 19 are provided for obstructing parts of the discharge-ports, or for closing the discharge-ports, these slides being disposed in a plane below the bottom of the partition.

Numerals 20 indicate recesses which open upon the bottom of the partition 7 for receiving the shaft 15. It will be seen that any transverse movements of the partition 7 will be prevented, since its side engage the ends of the hubs of the gear-wheel 17.

It will be appreciated that seed will be discharged uniformly to the fans from the hopper regardless of the inclination of the hopper. When it is desired to sow grass seed on rough ground or upon hillsides the vehicle and hopper will be disposed inclinedly, and by action of gravity the seed may be shifted to the lower side of the hopper, the result being that the seed or greater part thereof will be distributed to the "down-hill" side of the vehicle, the "up-hill" side receiving only a scant supply of the seed. By use of the herein described invention this objectionable feature may be avoided, the seed being delivered to the fans in equal quantities.

I claim as my invention:—

1. In a seeder, a hopper for seed, a partition disposed vertically in the hopper to divide the same into opposite side compartments, said hopper having an opening in its bottom at each side of the partition, a transverse shaft in the hopper, agitators on the shaft one in each compartment for loosening seed to facilitate gravitation thereof through said openings, a housing arranged beneath the hopper and open at opposite sides, oppositely operating fans mounted in the housing and facing toward the open sides thereof, and deflectors projecting downwardly from the openings in the hopper for directing seed into the lines of the oppositely flowing air currents from said fans for discharging the seed from the opposite sides of the housing with substantially equal force.

2. In a seeder, a hopper, a casing disposed beneath the hopper, a partition dividing the hopper in the opposite side compartments, a fan shaft arranged at the central portion of the housing and having fans facing toward the opposite sides thereof, a shaft in the hopper having an agitator thereon for each compartment, means connecting the fan shaft to the shaft in the hopper for driving the fan shaft, means for turning the shaft in the hopper, said housing having openings in its opposite sides in register with said fans, said hopper having openings in the bottoms of said compartments beyond the vertical planes of said fans, and means projecting downwardly from the openings in the hopper for directing seed from said compartments in substantially equal quantities into the oppositely impelled air currents from said fans.

In testimony whereof, I have affixed my signature.

JOHN W. BRICH, Jr.